United States Patent
Han et al.

(10) Patent No.: US 8,112,081 B2
(45) Date of Patent: *Feb. 7, 2012

(54) BROADCAST/MULTICAST SERVICE SYSTEM AND METHOD PROVIDING INTER-NETWORK ROAMING

(75) Inventors: Kyu-Sung Han, Seoul (KR); Dong-Hee Shim, Seoul (KR); Min-Jung Shon, Seoul (KR)

(73) Assignee: LG Electronics Inc., Seoul (KR)

( * ) Notice: Subject to any disclaimer, the term of this patent is extended or adjusted under 35 U.S.C. 154(b) by 383 days.

This patent is subject to a terminal disclaimer.

(21) Appl. No.: 12/173,769

(22) Filed: Jul. 15, 2008

(65) Prior Publication Data

US 2008/0301782 A1 Dec. 4, 2008

Related U.S. Application Data

(63) Continuation of application No. 11/196,344, filed on Aug. 4, 2005.

(60) Provisional application No. 60/598,447, filed on Aug. 4, 2004, provisional application No. 60/661,409, filed on Mar. 14, 2005, provisional application No. 60/648,139, filed on Jan. 27, 2005.

(30) Foreign Application Priority Data

Feb. 28, 2005 (KR) .................. 10-2005-0017041
Jul. 4, 2005 (KR) .................. 10-2005-0059809

(51) Int. Cl.
- *H04W 4/00* (2009.01)
- *H04W 68/00* (2009.01)
- *H04H 20/71* (2008.01)

(52) U.S. Cl. ............... 455/432.1; 455/433; 455/450; 370/312

(58) Field of Classification Search ............ 455/433, 455/458; 370/312

See application file for complete search history.

(56) References Cited

U.S. PATENT DOCUMENTS 6,512,756 B1  1/2003  Mustajarvi et al.
(Continued)

FOREIGN PATENT DOCUMENTS

CN  1914934  2/2007
(Continued)

OTHER PUBLICATIONS

"3$^{rd}$ Generation Partnership Project; Technical Specification Group Services and System Aspects; Multimedia Broadcast/Multicast Service (MBMS); Architecture and functional description (Release6)"; 3GPP Standard; 3GPP TR 23.846, 3$^{rd}$ Generation Partnership Project (3GPP), Mobile Competence Centre; 630, Route DES LUCIOLES; F-06921 Sophia-Antipolis CEDEX, France, No. 6.1.0. Dec. 1, 2002, pp. 1-114, XP050363964.

(Continued)

*Primary Examiner* — Erika Gary
*Assistant Examiner* — Michael Mapa
(74) *Attorney, Agent, or Firm* — Birch, Stewart, Kolasch & Birch, LLP

(57) ABSTRACT

A method of providing a broadcast/multicast (BCAST) service, the method including receiving, from a terminal, a request of access to a BCAST service, performing service authorization with a home network, delivering, to the terminal, a message including a rights object (RO) to access the BCAST service, if the terminal is authorized to receive the BCAST service as a result of the service authorization, and providing the BCAST service to the terminal that was authorized to receive the BCAST service.

11 Claims, 5 Drawing Sheets

U.S. PATENT DOCUMENTS

| | | | |
|---|---|---|---|
| 6,564,055 B1 | 5/2003 | Hronek | |
| 7,058,413 B2 | 6/2006 | Lin et al. | |
| 7,301,927 B2 | 11/2007 | Lee et al. | |
| 2002/0166357 A1 | 11/2002 | Di Serio | |
| 2003/0172165 A1 | 9/2003 | Xu et al. | |
| 2004/0008657 A1 | 1/2004 | Lee et al. | |
| 2004/0253942 A1* | 12/2004 | Mowry et al. | 455/410 |
| 2005/0170842 A1* | 8/2005 | Chen | 455/454 |
| 2005/0276229 A1* | 12/2005 | Torabi | 370/252 |
| 2006/0140196 A1 | 6/2006 | Tanaka et al. | |
| 2006/0291418 A1 | 12/2006 | Singh | |
| 2009/0141665 A1 | 6/2009 | Shim et al. | |

FOREIGN PATENT DOCUMENTS

| | | |
|---|---|---|
| EP | 1 392 074 A2 | 2/2004 |
| JP | 2001-508971 A | 7/2001 |
| JP | 2002-342285 A | 11/2002 |
| JP | 2003-186838 A | 7/2003 |
| JP | 2003-527966 A | 9/2003 |
| JP | 2004-7422 A | 1/2004 |
| JP | 2004-147228 A | 5/2004 |
| JP | 2004-166197 A | 6/2004 |
| RU | 2 157 598 C2 | 10/2000 |
| WO | WO-02/32165 A1 | 4/2002 |
| WO | WO-03/039167 A1 | 5/2003 |
| WO | WO-03/063418 A1 | 7/2003 |
| WO | WO-03/081937 A1 | 10/2003 |
| WO | WO-2004/042972 A2 | 5/2004 |
| WO | WO 2004/043098 A1 | 5/2004 |
| WO | WO-2004/084472 A2 | 9/2004 |

OTHER PUBLICATIONS

"Mobile Broadcast Services Requirements" 3GPP DRAFT; OMA-RD-BCAST-V1_0_0-20041029-D, $3^{RD}$ Generation Partnership Project (3GPP), Mobile Competence Centere; 650, Route DES LUCIOLES; F-06921 Sophia-Antipolis CEDEX; France, vol. TSG SA, No. Athens, Greece; 20041029, Oct. 29, 2004, XP050203762.

Hartung, BAC BCAST, "Use Case on Device Outside Broadcast Coverage," Jul. 19, 2004, pp. 1-4.

Hartung, Ericsson, OMA-BAC-BCAST-2004-0029-Overview-of-3GPP-MBMS, Overview of 3GPP MBMS, Jun. 15, 2004, pp. 1-18.

\* cited by examiner

ND METHOD PROVIDING
BROADCAST/MULTICAST SERVICE SYSTEM AND METHOD PROVIDING INTER-NETWORK ROAMING

CROSS REFERENCE TO RELATED APPLICATIONS

This is a continuation of pending U.S. application Ser. No. 11/196,344 filed on Aug. 4, 2005, which claims priority of U.S. Provisional Application No. 60/598,447 filed on Aug. 4, 2004, U.S. Provisional Application No. 60/661,409 filed on Mar. 14, 2005, U.S. Provisional Application No. 60/648,139 filed on Jan. 27, 2005, Korean Patent Application No. 10-2005-0017041 filed in Republic of Korea on Feb. 28, 2005, and Korean Patent Application No. 10-2005-0059809 filed in Republic of Korea on Jul. 4, 2005. The entire contents of each of these applications are hereby fully incorporated by reference.

BACKGROUND OF THE INVENTION

1. Field of the Invention

The present invention relates to a mobile communication system and, more particularly, to a broadcast/multicast service system and method supporting inter-network roaming in order to provide a broadcast/multicast service to a user when the user roams in a visiting network which may or may not be a broadcast type network.

2. Description of the Related Art

A broadcast/multicast service (referred to hereinafter as 'BCAST service') is a new type of service that provides a sky wave broadcast or supplementary information to a mobile terminal. The BCAST service includes both a broadcast service and a multicast service. A broadcast service, offered by a service provider, transmits usable information to every user who has subscribed to the services of the service provider. A multicast service, also offered by a service provider, transmits information only to a certain group of users who have subscribed for a specific subject or contents.

Currently, in the mobile communication network, a simple service is provided to provide simple information to users, but the BCAST service providing a multimedia type broadcast or various contents to users roaming in the mobile communication network is not provided yet.

Further, in a situation where the BCAST service is independently operated by each BCAST service provider, if a user who has subscribed to a specific service provider is moved to an area of a different service provider, continuity of the BCAST service for the user is not provided.

In addition, when the user who has subscribed for a specific BCAST service with the ussr's home network roams to a visiting network, there is no procedure, system or mechanism by which the BCAST service contents of the home network are provided to the user roaming in the visiting network. If the visiting network is a non-broadcast type network or is a broadcast type network which may be the same type as or different from the home network, there is no defined procedure by which the user roaming in the visiting network can obtain the BCAST service of the home network or the BCAST service of the visiting network. This inconveniences the user greatly.

SUMMARY OF THE INVENTION

Therefore, one object of the present invention is to provide a broadcast/multicast service (BCAST) system and method supporting inter-network roaming, which are capable of guaranteeing continuity of a broadcast/multicast service even when a user roams in the same service network or in a different service network.

Another object of the present invention is to provide a broadcast/multicast service system and method supporting inter-network roaming, which are capable of allowing a user who has roamed from a home network to a visiting network to receive a broadcast/multicast service by using a service supported in the visiting network.

Still another object of the present invention is to provide a broadcast/multicast service system and method capable of allowing a mobile terminal to use a service provided in a home network when the terminal roams among broadcast type networks.

Yet another object of the present invention is to provide a broadcast/multicast service system and method capable of allowing a mobile terminal to use a broadcast/multicast service through a non-broadcast type network when the terminal roams from a broadcast type network into a non-broadcast type network.

Another object of the present invention is to provide a mobile terminal, a system, a method, and computer software embodied on at least one computer-readable medium for implementing the method, for providing a BCAST service to an end user/terminal roaming in a visiting network, which overcome limitations and disadvantages associated with the background art.

According to an aspect of the present invention, there is provided a method of providing a broadcast/multicast (BCAST) service to a terminal, the method comprising: obtaining, by the terminal, at least one BCAST service from a visiting network when the terminal roams in the visiting network.

According to an aspect of the present invention, there is provided a method of obtaining a broadcast/multicast (BCAST) service when a terminal moves from a home network, the method comprising: receiving, by the terminal BCAST service guide information from the visiting network; transmitting, by the terminal, a request to access at least one BCAST service provided in the BCAST service guide information; and obtaining the at least one BCAST service from the visiting network.

According to an aspect of the present invention, there is provided a mobile terminal device for obtaining a broadcast/multicast (BCAST) service while roaming in a visiting network, the device comprising: a controller to receive BCAST service guide information from the visiting network, to transmit a request to access at least one BCAST service provided in the BCAST service guide information to the visiting network, and to obtain the at least one BCAST service from the visiting network.

According to an aspect of the present invention, there is provided a broadcast/multicast (BCAST) system comprising: a terminal, a home network of the terminal and configured to communicate with the terminal, and a visiting network configured to communicate with the home network and the terminal, wherein the terminal obtains at least one BCAST service from the visiting network when the terminal roams in the visiting network.

According to an aspect of the present invention, there is provided a method of providing a broadcast/multicast (BCAST) service when a terminal roams to a visiting network, the method comprising: providing, by a BCAST service distribution/adaptation (BSDA) unit of the visiting network, a service guide to the terminal; transmitting, by the terminal, a request to access at least one BCAST service to a BCAST subscription management (BSM) unit of the visiting network; transmitting, by the BSM unit of the visiting network, a service authorization request to a BSM unit of a home network of the terminal; receiving, by the BSM of the visiting network, a service authorization response form the BSM unit of the home network in response to the service authorization request; transmitting, by the BSM unit of the visiting network, at least one right object for accessing the at least one BCAST service to the terminal; and providing, by the BSDA unit of the visiting network, the at least one BCAST service to the terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

A broadcast/multicast (BCAST) service system and method that provide inter-network roaming in accordance with preferred embodiments of the present invention will now be described with reference to the accompanying drawings.

In the present invention, when a user (having a mobile terminal) who has subscribed to a BCAST service offered by a home network of the terminal roams from the home network to a visiting network, the user can receive, in the visiting network, the same BCAST service that is provided in the home network. In this case, the visiting network may transmit a service guide of the home network to the user in the visiting network, or incorporate the service guide of the home network with the visiting network's service guide and transmits it to the user in the visiting network.

In the present invention, when a user who has subscribed to a specific BCAST service roams from the user's home network to a visiting network, the visiting network checks service authentication of the user from the home network and provides a public key (right object) used to view contents of the BCAST service in the visiting network, to the terminal of the user.

In the present invention, when a user who has subscribed to a specific BCAST service roams from a broadcast type network to another same broadcast type network, or to a different broadcast type network, or to a non-broadcast type network, the user can still receive the BCAST service through the roamed network.

Figure 1:
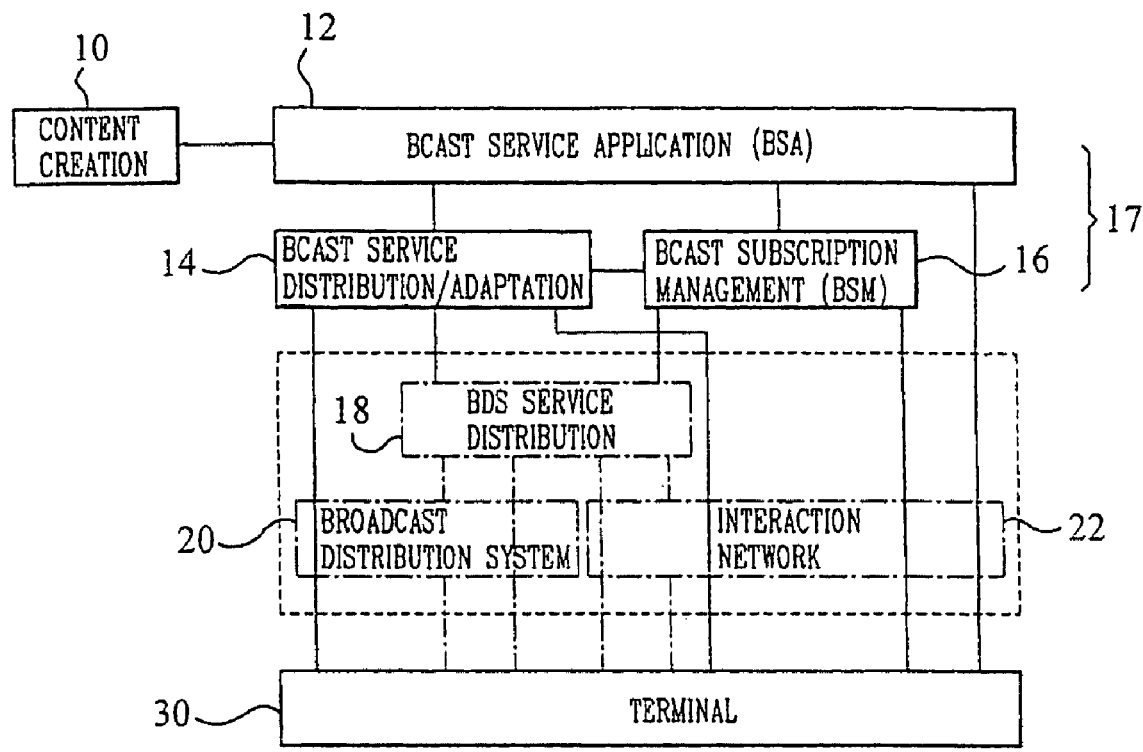
FIG. 1 is a block diagram showing the construction of a BCAST service system according to an embodiment of the present invention.

FIG. 1 is a block diagram showing the construction of a BCAST service system according to an embodiment of the present invention. All the components of the BCAST service system are operatively coupled.

As shown in FIG. 1, the BCAST service system includes a contents provider (content creation) 10 for providing contents to distribute in the BCAST service, a broadcast/multicast (BCAST) server 17 for providing a BCAST service to a user or performing protection of the contents or maintaining/managing the BCAST service, and a terminal 30 for receiving a BCAST service selected by the user from the BCAST server 17. The terminal 30 is a mobile terminal such as a mobile phone, a PDA, etc. and includes known elements including an input unit (e.g., a keypad, buttons, etc.), a controller, a memory, etc.

The BCAST service system additionally includes a broadcast distribution system (BDS) 20 or an interaction network (IN) 22 for distributing the BCAST service and performing an interaction function for bi-directional communication, and/or a BDS service distribution (BDS-SD) unit 18 for applying the interaction network according to a bearer. The units 18, 20 and 22 are involved in distributing the BCAST service contents provided by the server 17 to an appropriate device such as the terminal 30 or a home or visiting network.

The BDS 20 or the interaction network 22 is a bearer providing a BCAST service such as a DVB-H (Digital Video Broadcasting-Handled), an MBMS (Multimedia Broadcast Multicast Service), a BCMCS (Broadcast Multicast Service), an ISDB-T (Integrated Service Digital Broadcasting-Terrestrial), or a T/S DMB (Terrestrial/Satellite-Digital Multimedia Broadcasting). Thus the BDS 20 and the interaction network 22 support the broadcasting mechanism.

The BCAST server 17 includes a BCAST service application (BSA) unit 12 for performing functions such as protecting BCAST service contents and/or maintaining/managing the BCAST service, a BCAST service distribution/adaptation (BSDA) unit 14 for performing and controlling broadcasting, interface and contents scheduling function by using a specific bearer (DVB-H, MBMS, BCMCS, etc.), and a BCAST subscription management (BSM) unit 16 for performing functions of protecting/managing service/contents and maintaining/managing user subscription information in order to manage users who have subscribed to the BCAST service. In this case, the BSA unit 12, the BCAST service distribution/adaptation unit 14 and the BCAST subscription/management unit 16 of the BCAST server 17 transmit or exchange information and signals to each other or with each other through internal communication. Communications from the BSDA unit 14 and the BSM unit 16 may be communicated to a final destination device (e.g., the terminal 30) directly or through one or more of the BDS-SD unit 18, the BDS 20, and the interaction network 22.

The terminal 30 includes an application/software for receiving the BCAST service and an application for storing and editing a portion of a BCAST service list provided by the BCAST service provider and storing information on a channel preferred by the user. A BCAST service preference list edited and generated by the user by reflecting the preferences of the user based on the BCAST service list provided by the service provider is called a wish list. The terminal 30 and its associated network (e.g., the home network) may include an application for managing the wish list, which is called a wish list management application. The terminal 30 can be a mobile phone, a PDA, etc., but is not limited thereto and can be any device that is configured to receive BCAST services.

The wish list management application manages the wish list separately, and when a user of a terminal who has subscribed to a service of a specific provider roams to a service area of a different provider and receives a different BCAST service list provided by the corresponding provider, the wish list management application stores and edits a portion of the wish list. When the service provider of the visiting network to which the user has roamed does not provide a service list with respect to the BCAST provided in the terminal's home network, the wish list management application receives the service list from the home network in advance and stores it, or stores a service selected by the user among the provided service list in the wish list in advance.

A service provider providing a specific service can transfer a list of services provided in a network of a different service provider with which the service provider has made a roaming contract as well as a list of services provided in its own network. In this case, the service provider should indicate that the service is a service provided by a different provider and not by the service provider itself. Namely, the BCAST server includes a wish list checking application which fetches a wish list of the user's terminal and checks whether the BCAST server can currently provide any service on the wish list, and if the BCAST service cannot provide the services on the wish list, it checks whether a different provider or a different server can provide it.

The wish list checking application may exist in every BCAST server, and when a roaming contact exists between service providers, wish list checking applications in the BCAST servers of different providers can interwork so that a service requested by the user can be provided among BCAST services provided by each BCAST server. It should be noted that 'a wish list of the terminal' and 'a wish list of the user' refer to the same and are used below interchangeably.

The BCAST server 17 periodically can check the wish list of the terminal 30 and store it as part of the server 17's stored service broadcast list (server BCAST list) therein or in a separate storage unit outside the BCAST server. The BCAST server 17 can store therein (or in a separate storage unit) information on services which have been provided by different service providers to each requesting user. Thus, when a certain user requests a BCAST service thereafter, the BCAST server 17 searches its storage unit and obtains the current user's history of the BCAST service. And this information can be used by the BCAST server or others to provide the requested BCAST service to the current user more easily and quickly. In addition, even if the user does not provide the user's wish list to the BCAST server, since the BCAST server stores the corresponding information, the BCAST service can be provided to the user.

Figure 2:
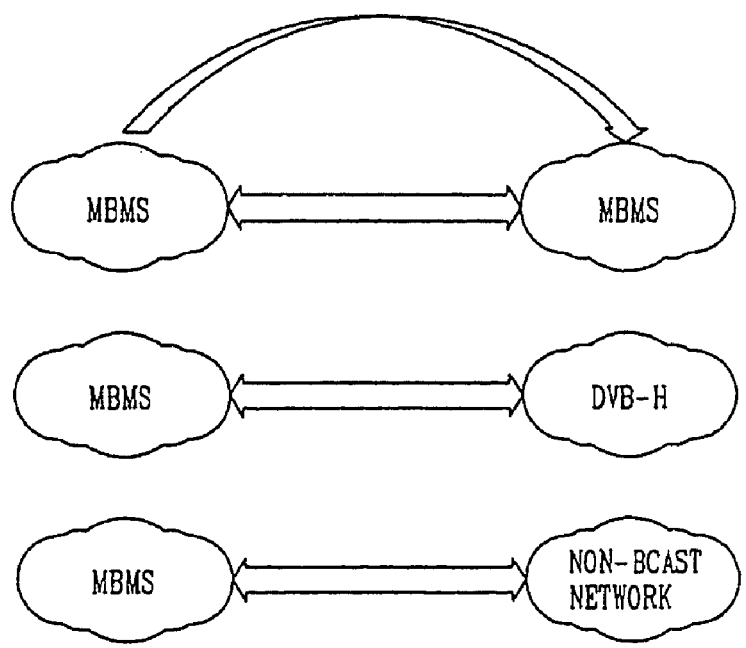
FIG. 2 illustrates three examples in which a terminal roams from a home network to a visiting network and receives a BCAST service in the visiting network according to embodiments of the present invention.

FIG. 2 illustrates three different examples in which a terminal may roam and still receive a BCAST service according to the embodiments of the present invention.

As shown in FIG. 2, a user of the terminal can roam between the same broadcast type networks (e.g., between MBMSs), can roam between different broadcast type networks (e.g., between the MBMS and the DVB-H), or can roam between a broadcast type network and a non-broadcast type network. In the third example, the broadcast type network is not limited to the MBMS or the DVB-H, but can be the BCMCS, ISDB-T, T/S-DMB, or others, and the non-broadcast type network can be the GSM or CDMA, which does not directly offer the BCAST service or does not support the broadcasting mechanism.

In some embodiments of the present invention, when the terminal (user) has subscribed to one or more BCAST services of a home network and roams to another network (visiting network) which may be the same type of broadcast network or a different type of broadcast network, the visiting network is configured to provide the BCAST service of the home network to the terminal by obtaining the BCAST service of the home network and broadcasting the BCAST service (contents) to the terminal in the visiting network. In another embodiment, the BCAST service of the visiting network may be provided to the terminal roaming in the visiting network, once the visiting network performs a service authorization check of the terminal through the home network of the terminal. Further, even if the visiting network is a non-broadcast type network, which does not support the broadcasting mechanism, the visiting network can still provide the BCAST service of the home network to the terminal roaming in the visiting network using a unitcast method. For example, even if the visiting network is a non-broadcast type network and only provides a general mobile communication service, the visiting network can still provide an MBMS service or a DVB-H service to the terminal.

Figure 3:
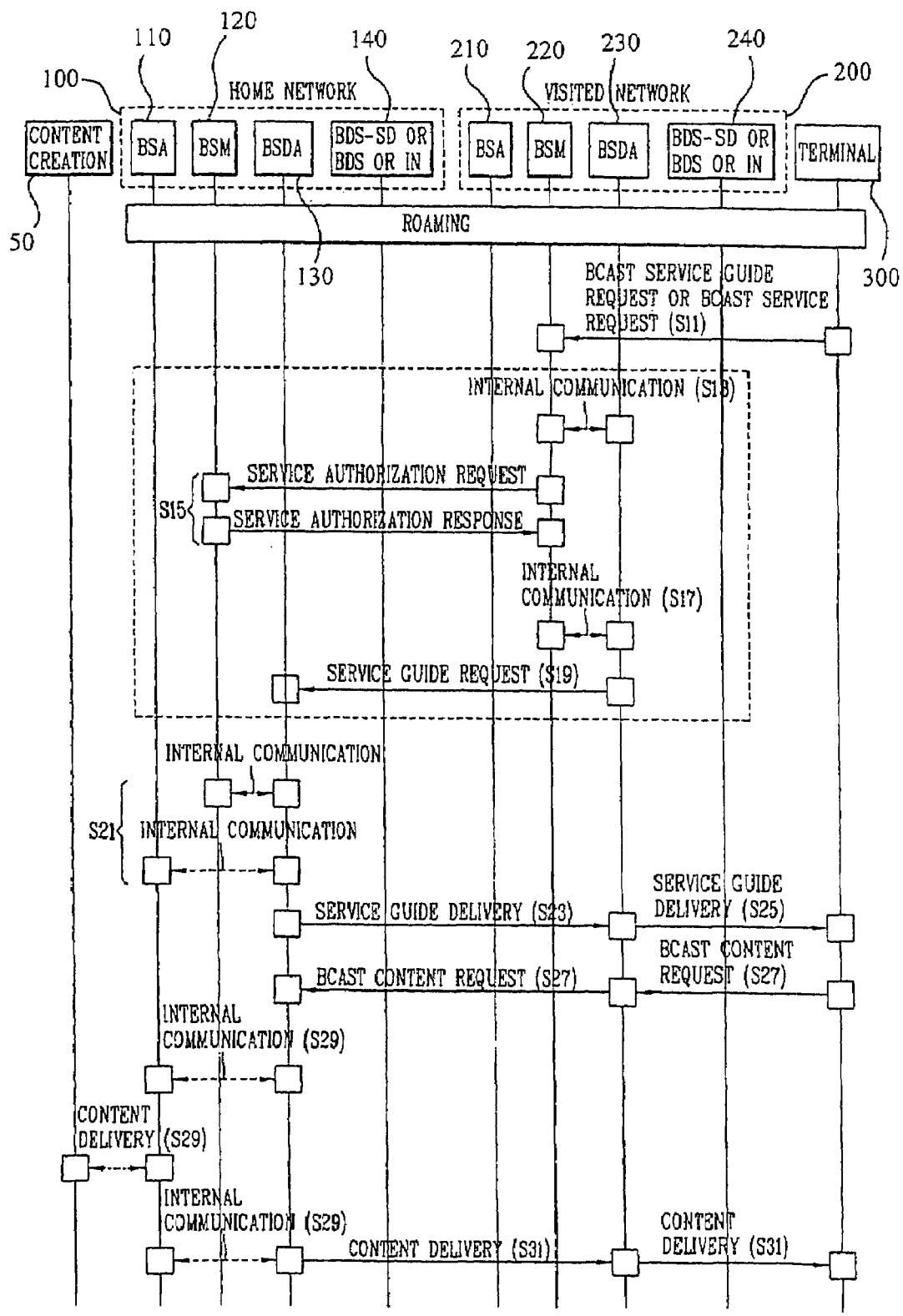
FIG. 3 is a signal flow chart of a BCAST service method wherein a terminal roams from a home network to a visiting network in accordance with a first embodiment of the present invention.

FIG. 3 is a signal flow chart of a BCAST service method according to an embodiment of the present invention. It is assumed that a user of a terminal 300 has a subscription to one or more BCAST services offered by a home network 100 of the terminal 300 before the user roams to a visiting network 200. The home network 100 may include a BSA unit 110, a BSM unit 120, a BSDA unit 130, and a BDS-SD unit or BDS or IN 140. The visiting network 200 may include a BSA unit 210, a BSM unit 220, a BSDA unit 230, and a BDS-SD unit or BDS or IN 240. The terminal 300 has the same configuration as the terminal 30 in FIG. 1. These components of the system have been discussed in connection with FIG. 1. The home network 100 and the visiting network 200 can be the same broadcast type networks or different broadcast type networks. All the components of FIG. 3 are operatively coupled.

Now, referring to FIG. 3, when the user of the terminal 300, which has roamed from the home network 100 to the visiting network 200, wants to receive a BCAST service at a current position (in the visiting network), the user operates a BCAST application of the terminal 300, and then, the terminal 300 transmits a BCAST service guide request message or a BCAST service request message to the BSM unit 220 of the visiting network 200 (step S11). This request message may include identification information of the user/terminal, etc.

The BSM unit 220 informs the BSDA unit 230 of the visiting network about the reception of the BCAST service guide request message or the BCAST service request message through internal communication (step S13), and checks the service authentication of the user of the terminal (step S15). For instance, a service authorization request message is sent from the BSM unit 220 to the BSM 120 of the home network. In this case, because the BCAST service subscription information of the terminal user (e.g., information on which service or which service bundle the user has subscribed to) exists in the home network 100, the BSM unit 220 of the visiting network requests the subscription information of the user from the BSM unit 120 of the home network (e.g., by transmitting the user/terminal ID, etc.) and performs the service authentication. The service authentication may involve verifying that the current user/terminal is a subscriber to the BCAST service(s) offered by the home network 100. In the alternative, the home network 100 may perform the actual service authentication and the visiting network 200 may just receive the result of the service authentication from the home network 100. In this regard, a service authorization response message from the BSM unit 120 to the BSM unit 220 may include the result of the service authentication check and/or other information needed for the subsequent procedures of the visiting network 200.

Upon checking the service authentication of the terminal 300, the BSM unit 220 of the visiting network informs the BSDA unit 230 that the service authentication has been completed and the current user/terminal is authorized, through internal communication (step S17). At this time, the BSDA unit 230 checks whether there is a wish list for the current user in a server BCAST list stored in the visiting network 200. The server BCAST list is stored in the BCAST server of the visiting network 200, and can exist in the BSA unit 210, in the BSM unit 220 or in the BSDA unit 230, or can be stored in a separate storage unit. The server BCAST list can be managed by the wish list checking application. The server BCAST list includes wish lists of a plurality of different users. A wish list of a user/terminal is the user's preferred BCAST service(s), which can be selected by the user from a list of all the BCAST services offered by the user's home network or from a list of all the BCAST services that the user has subscribed to from the user's home network. The wish list of the terminal may also include other information such as user information, which may be used to generate a service guide.

The wish list of the current user may be stored as part of the server BCAST list stored in the visiting network 200. For instance, before the user roams to the visiting network, the visiting network may obtain the wish list of the user in advance through communication with the home network. This can be accomplished in many different ways. For instance, once the user subscribes to the BCAST service(s) of the home network 100 and compiles the user's wish list based on the BCAST service list offered by the home network 100, the home network 100 can be configured to transmit the wish list to the visiting network 200 so that it can be prestored in the visiting network 200. The system can also be configured such that any updated wish list of the user, which is stored in the home network 100 and/or the terminal 300, is communicated to the visiting network 200 from the home network 100 or the terminal 300.

In the example of FIG. 3, it is assumed that the wish list of the current terminal 300 does not exist on the visiting network's server. However, the scenario in which the wish list of the current terminal 300 does exist on the visiting network's server, is discussed later in connection with FIG. 4.

If the wish list of the terminal 300 does not exist in the server BCAST list at step S17, the BSDA unit 230 of the visiting network transmits a service guide request message to the BSDA unit 130 of the home network 100 (step S19). Then the BSDA unit 130 of the home network collects various information (e.g., subscription information, user's wish list, etc.) for generating a service guide for the current terminal 300, from the BSM unit 120 and the BSA unit 110 of the home network 100 via internal communication (step S21). Thereafter, the BSDA unit 130 generates the service guide (BCAST service guide) based on the wish list of the current terminal.

The BSDA unit 130 of the home network transmits the generated service guide to the BSDA unit 230 of the visiting network (step S23), and the BSDA unit 230 of the visiting network transmits the service guide to the terminal 300 (step S25). In this case, the BSDA unit 230 of the visiting network can transmit the service guide received from the BSDA unit 130 of the home network to the terminal 300, or can transmit a new service guide obtained by incorporating a service guide of the visiting network 200 into the service guide received from the BSDA unit 130 of the home network. Namely, the service guide transmitted to the BSDA unit 230 of the visiting network from the BSDA unit 130 of the home network and the service guide transmitted from the BSDA unit 230 of the visiting network to the terminal 300 can be same service guides or different service guides. In step S31, the visiting network 200 broadcasts the service guide to the terminal 300 by using its broadcasting mechanism, e.g., through a broadcast distribution system (e.g., BDS 20 in FIG. 1) or an interaction network (e.g., IT 22 in FIG. 1).

When the user checks the BCAST service guide received by the terminal 300 and selects contents (BCAST service) desired to be received among the programs or services identified in the BCAST service guide, the terminal 300 transmits a BCAST contents request message to the BSDA unit 230 of the visiting network (step S27). In this case, the desired contents are a BCAST service provided in the home network. Thus the BSDA unit 230 of the visiting network transmits the BCAST contents request message to the BSDA unit 130 of the home network (step S27).

Upon receiving the BCAST contents request message, the BSDA unit 130 receives contents requested by the user from a contents provider 50 through internal communication with the BSA unit 110 (step S29), and transmits the received contents (BCAST service) to the terminal 300 through the BSDA unit 230 of the visiting network (step S31). The visiting network 200 transmits the contents to the terminal 300 by using its broadcasting mechanism. Accordingly, the user roaming in the visiting network receives the BCAST service of the user's home network.

Figure 4:
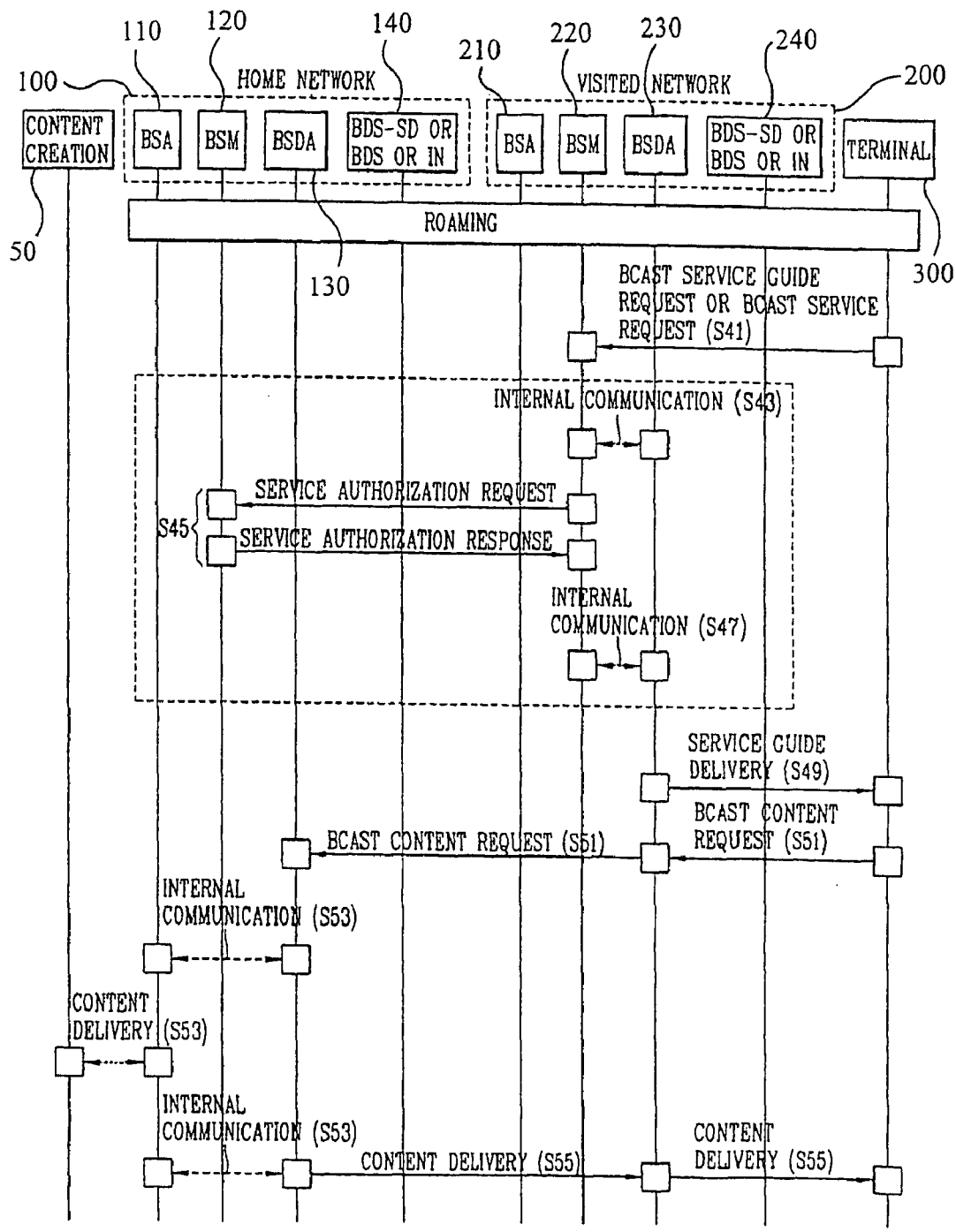
FIG. 4 is a signal flow chart of a BCAST service method wherein a terminal roams from a home network to a visiting network in accordance with a second embodiment of the present invention.

FIG. 4 is a signal flow chart of a BCAST service method according to another embodiment of the present invention, wherein a current terminal 300 roams to a visiting network 200. The system components discussed in the embodiment of FIG. 3 are also provided in the embodiment of FIG. 4. In FIG. 4, there is a wish list of the current terminal 300 in the server BCAST list of the BCAST server of the visiting network 200, which differs from the embodiment of FIG. 3. The home network 100 and the visiting network 200 can be the same broadcast type networks or different broadcast type networks. It is assumed that the user of the terminal 300 has a subscription to one or more BCAST services offered by the home network 100 of the terminal 300 before the user roams to the visiting network 200. All the components of FIG. 4 are operatively coupled.

Referring to FIG. 4, when the user of the terminal 300 which has roamed from the home network 100 to the visiting network 200 wants to receive a BCAST service at a current location in the visiting network 200, the user operates a BCAST application of the terminal 300 and transmits a BCAST service guide request message or a BCAST service request message to the BSM unit 220 of the visiting network (step S41).

The BSM unit 220 informs the BSDA unit 230 of the visiting network about the reception of the BCAST service guide request message or the BCAST service request message through internal communication (step S43), and checks the service authentication of the terminal/user through the BSM unit 120 of the home network (step S45). Steps S41, S43 and S45 correspond respectively to steps S11, S13 and S15 of FIG. 3.

Upon checking the service authentication of the terminal/user, the BSM unit 220 of the visiting network informs the BSDA unit 230 that the service authentication of the current terminal 300 has been completed and the current user is authorized to receive the BCAST service, through internal communication (step S47). Then in step S47, the BSDA unit 220 of the visiting network checks whether there is a wish list of the terminal 300 in the server BCAST list. The server BCAST list exists in the BCAST server of the visiting network, and it can exist in the BSA unit 210, in the BSM unit 220 or in the BSDA unit 230, and can be managed by the wish list checking application.

If there is the wish list of the terminal 300 in the server BCAST list of the visiting network, the BSDA unit 230 transmits a BCAST service guide to the terminal 300 (step 49). In this case, the BSDA unit 230 of the visiting network can transmit the BCAST service guide of the home network 100 based on the wish list of the terminal 300 to the terminal 300, or can transmit a new service guide obtained by incorporating the BCAST service guide of the visiting network 200 to the BCAST service guide of the home network 100, to the terminal 300. In addition, the BSDA unit 230 of the visiting network can collect various information (e.g., BCAST service attribute, etc.) from the BSM unit 220 of the visiting network and the BSA unit 210, for generating a service guide of the terminal 300 based on the wish list of the terminal 300 and generate the BCAST service guide for the terminal 300. The visiting network 200 can transmit the service guide to the terminal 300 by using its broadcasting mechanism, e.g., through a broadcast distribution system (e.g., BDS 20 in FIG. 1) or an interaction network (e.g., IT 22 in FIG. 1).

When the user checks the BCAST service guide received by the terminal 300 and selects contents desired to be received among programs or services described in the service guide, the terminal 300 transmits a BCAST contents request message to the BSDA unit 130 of the home network through the BSDA unit 230 of the visiting network (step S51).

Upon receiving the BCAST contents request message, the BSDA unit 130 of the home network receives contents requested by the user from a contents provider 50 through internal communication with the BSA unit 110 (step S53), and transmits the received contents (BCAST service) to the terminal 300 through the BSDA unit 230 of the visiting network (step S55). The visiting network 200 transmits the BCAST service contents to the terminal 300 by using its broadcasting mechanism. Accordingly, the user roaming in the visiting network receives the BCAST service of the user's home network.

Figure 5:
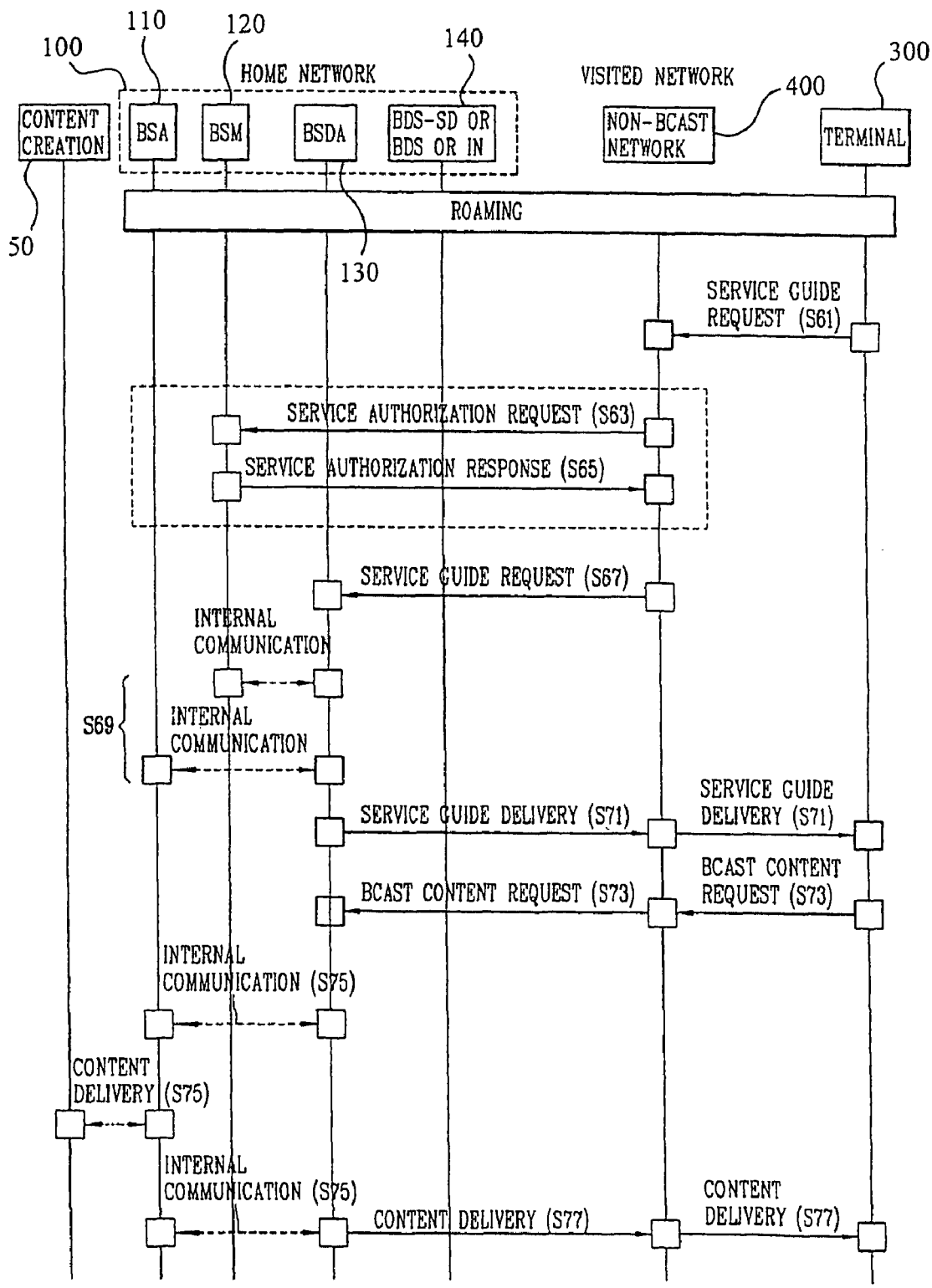
FIG. 5 is signal flow chart of a BCAST service method wherein a terminal roams from a home network to a visiting network in accordance with a third embodiment of the present invention.

FIG. 5 is a signal flow chart of a BCAST service method according to another embodiment of the present invention. This embodiment differs from the embodiments of FIGS. 3 and 4 in that the visiting network 400 is a non-broadcast type network. Although the visiting network 400 does not directly offer the BCAST service, the terminal user receives the BCAST service through a uni-cast method of the visiting network according to this embodiment. The user of the terminal 300 has subscribed to the BCAST service of the home network before the user roams to the visiting network 400. All the components of FIG. 5 are operatively coupled.

As shown in FIG. 5, since the non-broadcast type network (visiting network 400) indicated by a wireless network or a mobile communication network does not have an entity for providing the BCAST service, it transmits a service guide and/or contents transmitted from the home network 100 to the current terminal 300 through its packet switched network. That is, communications between the visiting network 400 and the terminal 300 occur using existing communication protocols between the visiting network 400 and the terminal 300.

Referring to FIG. 5, when the user of the terminal 300 roams or moves from the user's home network 100 (namely, a broadcast type network) to another network (the visiting network 400, namely a non-broadcast type network), the user operates the BCAST application of the user's terminal 300 and the terminal 300 transmits a BCAST service guide request message or a BCAST service request message to the non-broadcast type visiting network 400 (step S61).

Upon receiving the request message, the non-broadcast type visiting network (e.g., a server therein) 400 requests the BSM unit 120 of the home network 100 to check the service authentication of the terminal user (step S63), and the BSM unit 120 of the home network checks the service authentication of the terminal user and transmits a response message including the service authentication result to the non-broadcast type visiting network 400 (step S65). In this case, because the BCAST service subscription information of the terminal user (e.g., information on which service or which service bundle the user has subscribed to) exists in the home network 100, the visiting network 400 requests the subscription information of the user from the BSM unit 120 of the home network (e.g., by transmitting the user/terminal ID, etc.) and performs the service authentication. The service authentication may involve verifying that the current user/terminal is a subscriber to the BCAST service(s) offered by the home network 100. In the alternative, the home network 100 may perform the actual service authentication and the visiting network 400 may just receive the result of the service authentication from the home network 100.

Upon checking the service authentication of the terminal 300, the non-broadcast type visiting network 400 transmits a service guide request message to the BSDA unit 130 of the home network (step S67). Upon receiving the service guide request message, the BSDA unit 130 of the home network collects service guide information of the terminal 300 from the BSM unit 120 of the home network and the BSA unit 110 through internal communication (step S69). In this case, since the visiting network 400 is a non-broadcast type and thus does not have an entity for providing the BCAST service (via a broadcasting mechanism), the visiting network 400 does not itself have a wish list of the terminal 300 or a service guide with respect to the BCAST service provided from the home network or any other network. Accordingly, the visiting network 400 must obtain the service guide of the terminal 300 from the BSDA unit 130 of the home network, and the BSDA unit 130 of the home network collects the service guide information for the current terminal 300 based on the wish list of the terminal 300 prestored in the home network or provided by the terminal 300.

The BSDA unit 130 of the home network then generates a BCAST service guide for the current terminal 300 using the collected service guide information. The BSDA unit 130 then transmits the generated service guide to the visiting network 400 (step S71), and the visiting network 400 transmits the service guide to the terminal 300 (step S71). In this case, the service guide transmitted by the visiting network 400 to the terminal 300 is the same as the service guide received from the home network 100.

When the user checks the BCAST service guide received by the terminal 300 and selects contents desired to be received among programs or services listed in the service guide, the terminal 300 transmits a BCAST contents request message to the BSDA unit 130 of the home network through the visiting network 400 (step S73).

Upon receiving the BCAST contents request message, the BSDA unit 130 of the home network receives contents requested by the user from a contents provider 50 through internal communication with the BSA unit 110 (step S75), and transmits the corresponding contents to the terminal 300 through the non-broadcast type visiting network 400 (step S77). In this case, the visiting network 400, which has received the contents (BCAST service) from the BSDA unit 130 of the home network, transmits the contents to the terminal 300 through its packet switched network/method since the visiting network 400 is a non-broadcast type network. Namely, the contents (BCAST service) are transferred by 1:1 through a uni-cast method only between the server of the non-broadcast type visiting network 400 and the terminal 300, e.g., through a data service channel provided in a mobile communication network and not through a broadcast distribution system (BDS) or an interaction network.

In the embodiment of FIG. 5, if an audio/video codec supported in the network offering the BCAST service (broadcast type network) and an audio/video codec supported in a visiting mobile communication network (non-broadcast type network) do not correspond, a certain transformation process for making the codecs correspond to each other may be used. For example, if the broadcast type network for providing BCAST service contents supports MPEG4 while the mobile communication network (non-broadcast type visiting network) for receiving the BCAST service contents supports MPEG2, not MPEG4, then the mobile communication network is configured to decode the MPEG-4 contents received from the broadcast type network, encode them to MPEG2 and then transmit the MPEG-2 contents to the user terminal. In this case, a procedure for exchanging a contents coding method supported in the broadcast type network and a contents coding method supported in the mobile communication network (non-broadcasting type network) can be added before the contents are provided, and such a procedure is known. In addition, if the home network knows capabilities (for example, a supported codec, a data rate, resolution of a screen of the terminal) of the user's terminal, then corresponding information (e.g., terminal's capability information) can be transmitted to the visiting network so that the visiting network can use the information to suitably transform the contents received from the home network before transmitting it to the user's terminal.

In the embodiments of FIGS. 3-5, it has been described that the wish list of the current user is used to generate the service guide to be provided to the terminal roaming in the visiting network. However, the present invention is not limited thereto, and encompasses a situation where the wish list of the current user is not used to generate the service guide to the current user at the terminal. For instance, without regards to the user's wish list, the service guide, to be provided to the end user at the terminal 300, may be a service guide generated based on the user's subscription policy, or can be a service guide that includes all the BCAST services offered by the home or visiting network.

Figure 6:
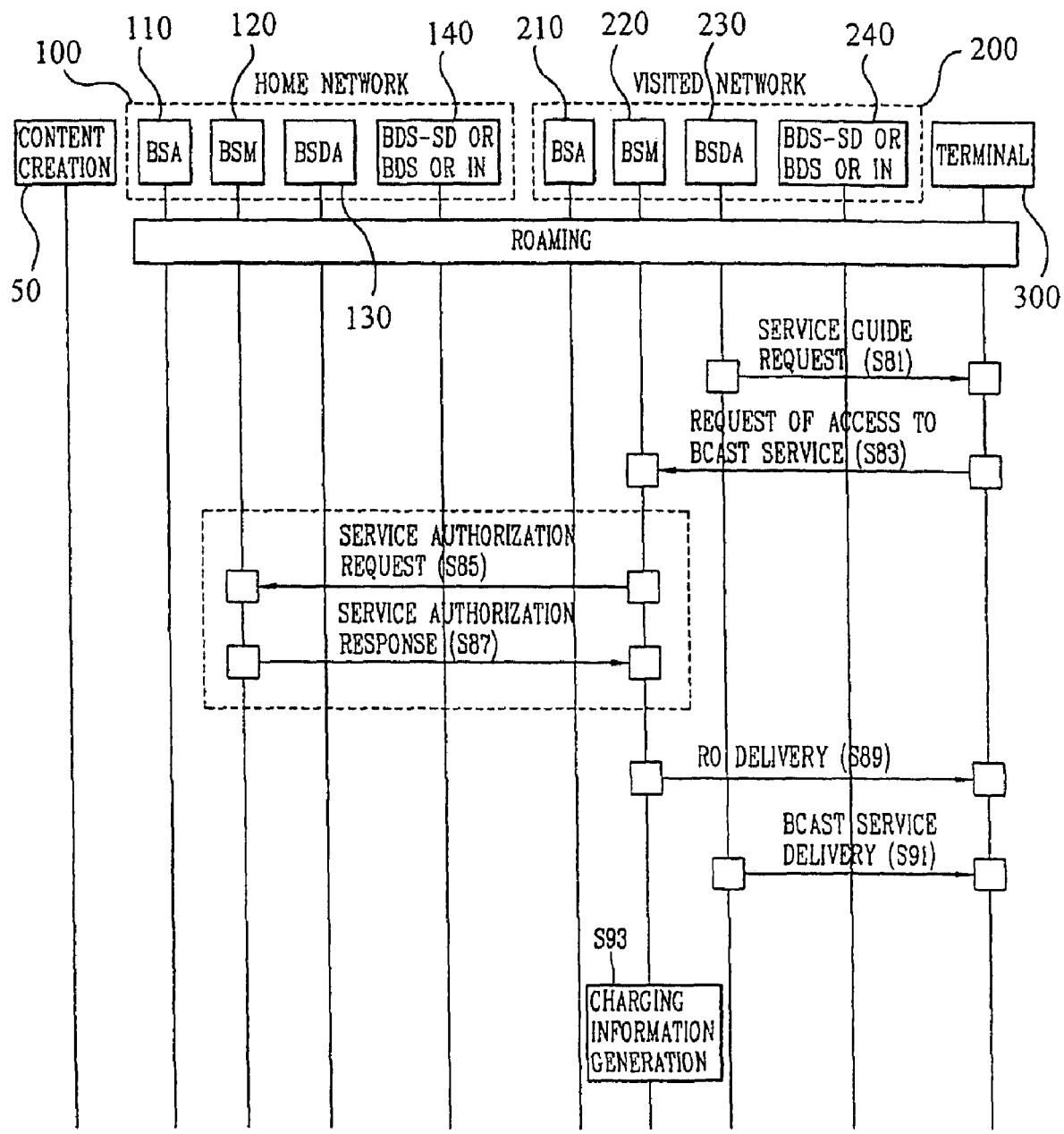
FIG. 6 is signal flow chart of a BCAST service method wherein a terminal roams from a home network to a visiting network in accordance with a fourth embodiment of the present invention.

FIG. 6 is a signal flow chart of a BCAST service method according to another embodiment of the present invention. In this embodiment, a BCAST service guide is transmitted from a visiting network 200 to a terminal 300 before the terminal requests it. That is, the visiting network, which is a broadcast type network, broadcasts its service guide repeatedly using its broadcasting mechanism (e.g., BDS or interaction network) to all terminals roamed into the visiting network. Each terminal then can request access (request right objects) to one or more BCAST services on the service guide, and thereby accesses the BCAST service.

In FIG. 6, it is assumed that the user of the current terminal 300 has a subscription to one or more (BCAST) services offered by the home network 100 of the terminal 300 before the user roams to the visiting network 200. The home network 100 may include a BSA unit 110, a BSM unit 120, a BSDA unit 130, and a BDS-SD unit or BDS or IN 140. The visiting network 200 may include a BSA unit 210, a BSM unit 220, a BSDA unit 230, and a BDS-SD unit or BDS or IN 240. These components have been discussed in connection with FIG. 1. The home network 100 and the visiting network 200 can be the same broadcast type networks or different broadcast type networks. All the components of FIG. 6 are operatively coupled.

Now, referring to FIG. 6, the terminal 300, which has roamed to the visiting network 200, receives a BCAST service guide of the visiting network 200 from the BSDA unit 230 of the visiting network, without being connected with the home network 100 (step S81). Namely, the visiting network 200 provides its service guide to the terminal 300 which has roamed to the visiting network 200, without the user's request and without any contact with the home network 100. This may be accomplished by the visiting network 200 by repeatedly broadcasting its service to all terminals that roamed into the visiting network 200, e.g., using its broadcasting mechanism.

Upon checking the service guide, the user requests a use privilege (access information, e.g., right object(s) RO) in order to access a specific BCAST service identified in the service guide from the BSM unit 220 of the visiting network (step S83). The use privilege is a right with respect to contents requested by the user or a right for accessing or using the BCAST service. The BSM unit 220 of the visiting network receives this request and also checks the service authentication of the corresponding terminal 300 from the BSM unit 120 of the home network. Namely, the BSM unit 220 of the visiting network transmits a service authentication request message to the BSM unit 120 of the home network (step S85), and the BSM unit 120 of the home network checks the service authentication of the terminal and transmits a service authentication response message to the BSM unit 220 of the visiting network (step S87). The service authentication response message includes the result of the service authentication. The service authentication may involve determining whether or not the current terminal 300 is a subscriber of the home network 100, and examining in detail the subscription policy of the user of the terminal 300 so as to determine whether or not the user should receive the specific BCAST service requested by the user at step S81. The actual service authentication can be performed by the home network 100, or the visiting network, or in part by the home network and in part by the visiting network.

If the service authentication result indicates that the terminal 300 is authorized to receive the BCAST service, the BSM unit 220 of the visiting network transmits the use privilege (access information such as RO) for allowing access and/or use of the specific BCAST service requested by the user, to the user (step S89). RO can be a key or code to open or decrypt the BCAST service (contents). The BSDA unit 230 of the visiting network transmits the user-requested contents (BCAST service) to the terminal 300 through its broadcasting mechanism (step S91). In this case, the BSDA unit 230 and the BSM unit 220 may transmit or exchange information and signals through internal communication.

Upon receiving the contents, the terminal 300 accesses or interprets the received contents by using the RO. The BSM unit 220 of the visiting network generates charging (billing) information (e.g., charges regarding the use of the contents, etc.) according to the use of the corresponding contents (S93), and the visiting network 200 can send the generated charging information to the home network 100 so that the user can be billed appropriately by the home network. The visiting network 200 sends the charging information to the home network 100 for the services the visiting network provided since the user has a subscription contract with the home network 100. The charging information may include any other service fee of the visiting network 200 for allowing the roaming user to receive a BCAST service.

According to the present invention, the step of generating the charging information in step S93 may also be performed in other embodiments, e.g., in the embodiments of FIGS. 3-5. For instance, if the visiting network merely passes on the BCAST service contents provided by the home network, the charging information may include any service fee of the visiting network 200 for merely passing on the BCAST service contents.

As so far described, the broadcast/multicast service system and method for supporting inter-network roaming in accordance with the embodiments of the present invention have many advantages.

For example, after the terminal roams into a visiting network, it can now receive the same BCAST service as the BCAST service that the terminal has received in the home network, at a current location in the visiting network.

In addition, because the user can set and receive his/her preferred BCAST service with continuity regardless of its position (e.g., whether the user is currently located in the home network or visiting network), the user's convenience and satisfaction for receiving the BCAST service can be enhanced greatly.

The foregoing embodiments and advantages are merely exemplary and are not to be construed as limiting the present invention. The present teaching can be readily applied to other types of apparatuses or systems. The description of the preferred embodiments of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of providing a broadcast/multicast (BCAST) service that is defined according to an Open Mobile Alliance (OMA) standard from a home network to a terminal, the method comprising:
    performing roaming procedures with the home network and the terminal;
    delivering a BCAST service guide to the terminal after performing the roaming procedures, the BCAST service guide being defined in the OMA standard and containing information related to broadcast areas, service areas, service lists, and user preferences;
    receiving, from the terminal, a request to access the BCAST service that is supported by the OMA standard;
    performing service authorization between a home network;
    delivering, to the terminal, a message including a rights object (RO) to access the BCAST service according to the OMA standard, if the terminal is authorized to receive the BCAST service as a result of the service authorization,
    wherein the RO is used for service authentication to determine whether or not the terminal is a subscriber of the home network and to examine subscriber policies thereof; and
    providing the BCAST service according to the OMA standard to the terminal if the BCAST service is authorized.

2. The method of claim 1, wherein the service authorization is performed in cooperation with a BCAST subscription management (BSM) entity of the home network.

3. The method of claim 2, wherein the performing step comprises:
    sending a service authorization request message to the BCAST subscription management (BSM) entity of the home network.

4. The method of claim 2, wherein the performing step comprises:
    receiving a service authorization response message from the BCAST subscription management (BSM) entity of the home network, the service authorization response message includes a result of the service authorization.

5. A network that provides a broadcast/multicast (BCAST) service that is defined according to an Open Mobile Alliance (OMA) standard, the network comprising:
    a BCAST subscription management (BSM) entity, being defined in the OMA standard, that is adapted to receive a request to access the BCAST service that is supported in the OMA standard from a terminal, to perform service authorization with a home network, and to deliver a message, which includes a rights object (RO) to access the BCAST service that is supported in the OMA standard, to the terminal if the terminal is authorized to receive the BCAST service as a result of the service authorization,
    wherein the RO is used for service authentication to determine whether or not the terminal is a subscriber of the home network and to examine subscriber policies thereof; and
    a BCAST service distribution/adaptation (BSDA) entity, being defined in the OMA standard, cooperating with the BSM entity and adapted to deliver a BCAST service guide defined in the OMA standard to the terminal and to provide the BCAST service to the terminal if the BCAST service is authorized,
    wherein the network including the BSM entity and the BSDA entity performs roaming procedures with the terminal, and
    wherein the network including the BSM entity and the BSDA entity delivers a BCAST service guide to the terminal, the BCAST service guide containing information related to broadcast areas, service areas, service lists, and user preferences.

6. The network of claim 5, wherein the BSM entity is adapted to perform the service authorization in cooperation with a BCAST subscription management (BSM) entity of the home network.

7. The network of claim 6, wherein the BSM entity is adapted to perform the service authorization by sending a service authorization request message to the BCAST subscription management (BSM) entity of the home network.

8. The network of claim 6, wherein the BSM entity is adapted to perform the service authorization by receiving a service authorization response message from the BCAST subscription management (BSM) entity of the home network, the service authorization response message including a result of the service authorization.

9. A method of receiving a broadcast/multicast (BCAST) service that is defined according to an Open Mobile Alliance (OMA) standard by a terminal that performs wireless communication with at least one of a home network and a visited network, the method comprising:

performing roaming procedures with a home network and a visited network of the terminal prior to sending the request of access to a BCAST service that is supported by the OMA standard;

receiving a BCAST service guide defined in the OMA standard from the visited network after performing the roaming procedures, the BCAST service guide containing information related to broadcast areas, service areas, service lists, and user preferences;

sending a request to access the BCAST service to the visited network;

receiving a message including a rights object (RO) to access the BCAST service from the visited network, according to information as to whether or not the BCAST service has been authorized as a result of service authorization performed by the visited network with the home network, wherein the RO is used for service authentication to determine whether or not the terminal is a subscriber of the home network and to examine subscriber policies thereof; and receiving the BCAST service from the visited network if the BCAST service is authorized, such that the BCAST service is continuously provided after roaming to allow the user to receive the BCAST service without noticeable interruptions after roaming to the visited network.

10. The method of claim 9, wherein the result of the service authorization refers to a roaming service status that indicates whether the terminal has been authorized for roaming services or not.

11. A terminal that receives a broadcast/multicast (BCAST) service that is defined according to an Open Mobile Alliance (OMA) standard, the terminal comprising:

a controller and an input unit that cooperate to:

perform roaming procedures with a home network and a visited network;

receive a BCAST service guide from the visited network after performing the roaming procedures, the BCAST service guide containing information related to broadcast areas, service areas, service lists, and user preferences;

send a request to access the BCAST service to a visited network;

receive a message including a rights object (RO) to access the BCAST service from the visited network, according to information as to whether or not the BCAST service has been authorized as a result of service authorization performed by the visited network with a home network, wherein the RO is used for service authentication to determine whether or not the terminal is a subscriber of the home network and to examine subscriber policies thereof; and receive the BCAST service from the visited network if the BCAST service is authorized.

\* \* \* \* \*